United States Patent [19]

Levefelt

[11] 4,272,134
[45] Jun. 9, 1981

[54] ROTARY DRILL BIT

[75] Inventor: Bert G. Levefelt, Sandviken, Sweden

[73] Assignee: Sandvik Aktiebolag, Sandviken, Sweden

[21] Appl. No.: 52,185

[22] Filed: Jun. 26, 1979

[30] Foreign Application Priority Data

Jul. 11, 1978 [SE] Sweden ............................... 7807708

[51] Int. Cl.³ .......................... F16C 1/24; F16C 19/16
[52] U.S. Cl. ..................................... 308/8.2; 175/337; 308/187
[58] Field of Search ....................... 175/228, 229, 337; 308/8.2, 76, 77, 187

[56] References Cited

U.S. PATENT DOCUMENTS

| 2,086,681 | 7/1937 | Scott | 308/8.2 |
| 2,654,577 | 10/1953 | Green | 308/8.2 |
| 4,136,748 | 1/1979 | Dickerhoff | 308/8.2 X |

Primary Examiner—Frederick R. Schmidt
Attorney, Agent, or Firm—Burns, Doane, Swecker & Mathis

[57] ABSTRACT

A rotary drill bit comprising at least one rotatably carried roller cutter (17) and provided with passages (26,27,28) for supplying cooling fluid to the bearing system (11-15) of the roller cutter. For purposes of preventing the heat generated at an annular surface (31) transmitting axial forces from causing rapid bearing wear a recess (32) is provided in the annular surface (31). The recess (32) communicates with the passages (26,27,28) and extends entirely around the bearing shaft (16) for allowing circulation of cooling fluid therearound.

10 Claims, 7 Drawing Figures

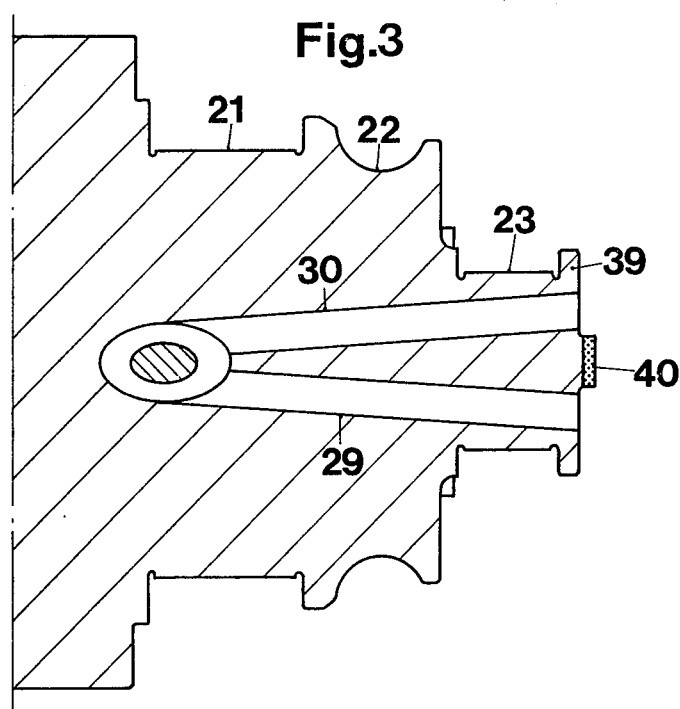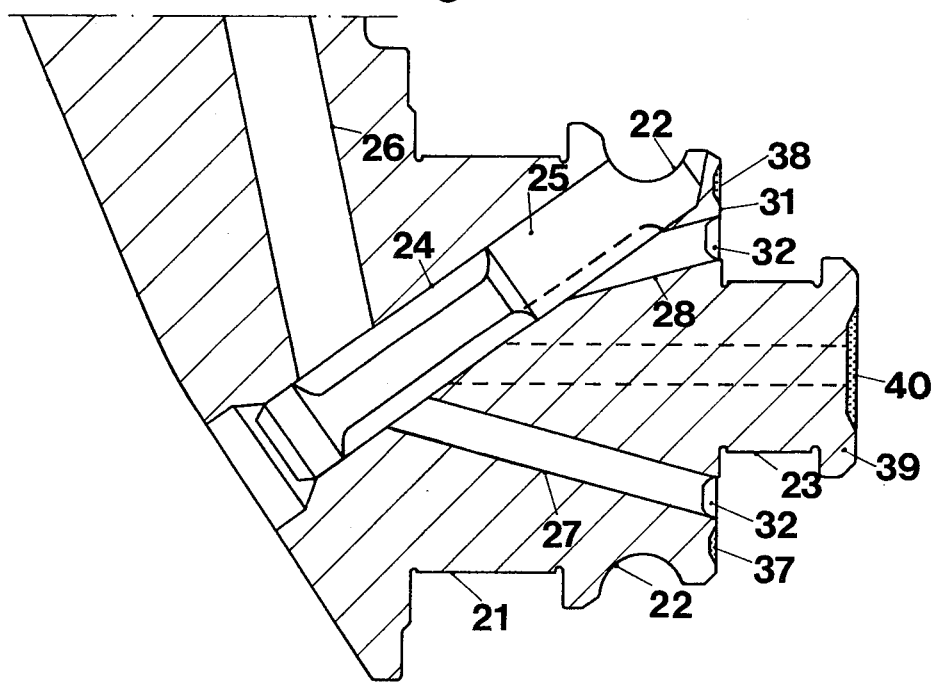

ROTARY DRILL BIT

The present invention relates to a rotary drill bit of the type comprising at least one roller cutter which is rotatably carried on a bearing shaft over bearing means. The bearing means comprises cooperating annular surfaces on the roller cutter and the bearing shaft over which surfaces axial forces are transmitted from the roller cutter to the bearing shaft. Passage means are provided in the bearing shaft for supplying cooling fluid to the bearing means.

A rotary drill bit of the above type is connected to a drill string as the lowermost member thereof. During rotation and downward movement of the drill string the drill bit breaks up and crushes the material to be worked so as to form a drill hole. Particularly in blast hole drilling high feeding forces are applied on the drill string. The feeding force causes axial and radial reaction forces on the drill bit. The axial forces are transmitted from the roller cutter to the bearing shaft over an axial bearing at the outermost end of the bearing shaft and over the above annular surfaces on the roller cutter and the bearing shaft.

In prior art drill bits of the above type the cooling of the annular axial bearing surfaces has proved to be unsatisfactory, thereby causing unacceptable high bearing temperature to be generated.

The object of the present invention is to efficiently cool the annular axial bearing surfaces which are positioned axially inwardly of the outer end of the bearing shaft.

The invention is described in detail in the following description with reference to the accompanying drawings in which two embodiments are shown by way of example. It is to be understood that these embodiments are only illustrative of the invention and that various modifications thereof may be made within the scope of the claims following hereinafter.

In the drawings,

FIG. 3 is a section through the bearing shaft in FIG. 2 taken on the line III—III.

FIG. 4 is a section through the bearing shaft in FIG. 2 taken on the line IV—IV.

Figure 1:
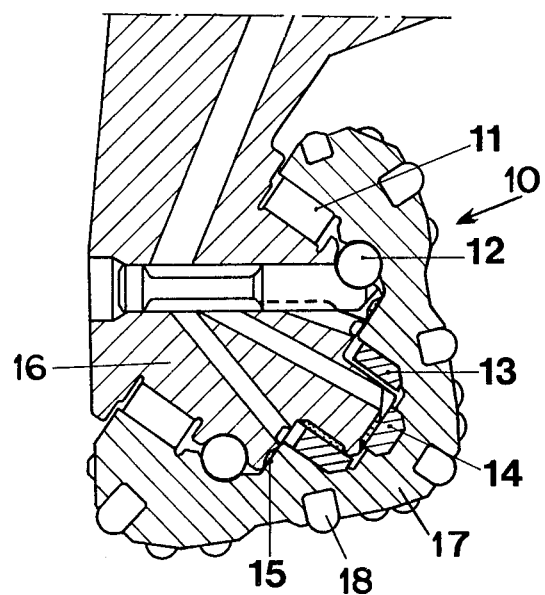
FIG. 1 shows in section a roller cutter and the bearing shaft associated therewith in a rotary drill bit according to the invention.

FIG. 1 shows a rotary drill bit for rotary drilling in rock and earth formations. The drill bit comprises in conventional manner three separate legs which form part of a bit head 10. A rotary drill bit of this type is disclosed in Swedish Pat. No. 7706480-6. For the sake of clarity only one leg is shown in FIG. 1. The lowermost portion of the leg 10 is formed as a bearing shaft 16 upon which a roller cutter 17 is rotatably carried. The roller cutter 17 is provided with cutting means 18, in the illustrated embodiment hard metal inserts which are press-fitted in corresponding holes in the roller cutter, so as to break up and crush rock and earth formations when the bit is rotated and moved downwards the hole being drilled.

Figure 2:
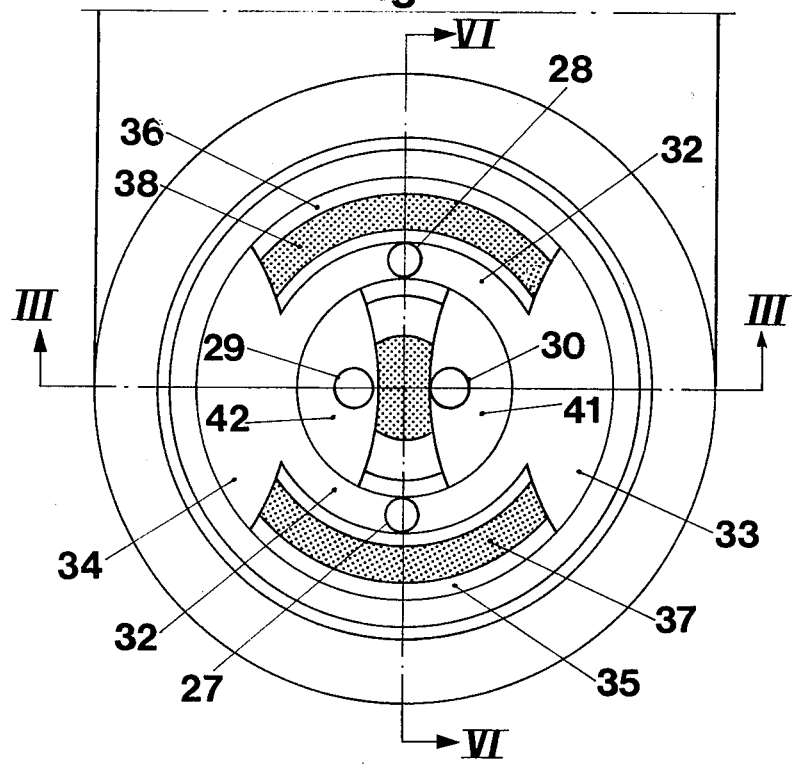
FIG. 2 shows a front view of the bearing shaft in a rotary drill bit according to a first embodiment of the invention provided with a radial roller bearing at the outermost end of the bearing shaft.

The bearing system for the rotatable supporting of the roller cutter 17 comprises a radial roller bearing 11, a ball bearing 12, a radial bearing 13—either a friction bearing as shown in FIGS. 1 and 5–7 or a roller bearing as shown in FIGS. 2–4—, an axial friction bearing 14, and an axial friction bearing 15. The axial bearing 15 is formed by a shoulder on the roller cutter 17 and a cooperating annular surface, 31, FIG. 4, 31', FIG. 7, on the bearing shaft 16. For purposes of distinguishing the axial bearing 14 from the axial bearing 15 the latter is usually called the large axial friction bearing. During rotation of the roller cutter 17 around the bearing shaft 16 friction arises at the axial friction bearings 14,15, thereby causing heat generation. In order to reduce wear the bearings 14,15 must be cooled. This invention seeks to provide improved means for cooling the large axial bearing.

In the embodiment according to FIGS. 2–4 the bearing shaft 16 is provided with recesses 21,22,23 for respectively a radial roller bearing, a ball bearing and a radial roller bearing. The separate balls in the ball bearing are inserted through a ball loading bore 24. Upon completed insertion the separate balls are retained by means of a plug 25 which is inserted into the bore 24 and secured therein, preferably by welding.

Cooling fluid, preferably air, is supplied to the bearing system through a main passage 26. Water and oil may be added to the air, water to keep the dust down and oil to grease the bearings. The passage 26 terminates into the bore 24. The passage 26 communicates with a plurality of smaller passages 27,28, FIG. 4 and 29,30, FIG. 3 in the bearing shaft via a reduced diameter portion on the plug 25.

The passages 27,28 terminate at a surface 31 on the bearing shaft which surface forms one of the corresponding surfaces in the large axial bearing 15.

According to the invention a recess 32 is formed in the surface 31. The recess 32 extends entirely around the bearing shaft, thereby providing a continuous path for the cooling fluid therearound. The recess 32 may be a circular groove as illustrated, or oval or of other suitable shape. In the illustrated embodiment the recess 32 is formed in the bearing shaft 16; it may, however, alternatively be formed in the roller cutter 17.

According to the invention, the recessed portion on the surface 31 further comprises two substantially segment-shaped recesses 33,34 which are positioned at diametrically opposed sides of the bearing shaft. The recesses 33,34 have about the same depth as the recess 32 and extend radially from the closed continuous fluid path, i.e. the groove 32, to the periphery of the annular surface 31 during increase in size with the radial distance from the centre of the bearing shaft 16.

Due to the recesses 32,33,34 there are provided two substantially segment-shaped abutments 35,36, which are positioned at diametrically opposed sides of the bearing shaft 16. The large axial bearing surface on the roller cutter 17 is in slidable engagement with the abutments 35,36. The passages 27,28 terminate in the groove 32 straight in front of the abutments 35,36 at diametrically opposed sides of the outer reduced diameter end portion of the bearing shaft 16. A hard-facing material 37,38, such as Stellite, is applied by welding on the abutments 35,36, thereby rendering the abutments more resistant against the wear caused by the frictional engagement between the large axial bearing surfaces.

During drilling the cooling fluid flows through the passages 26,27,28 into the groove 32. The groove 32 allows the fluid to flow in both directions towards the recesses 33,34 and out therethrough. The cooling fluid then flows past the ball bearing 12 and the roller bearing 11 to cool these bearings, whereupon the fluid flows out through the annular gap between the roller cutter 17 and the leg 10. Due to the location of the passages 27,28 and the shape of the groove 32 the large axial friction bearing 15 is efficiently cooled. Secondarily, also an improved cooling of the radial bearing 13 is obtained.

In cases where the rotary drill bit has small dimensions sufficient cooling can be provided by means of solely one of the passages 27,28; suitably passage 27. It is also obvious that, instead of terminating into the groove 32, the passages 27,28 may terminate into the recesses 33,34. The requirement which must be met in order to obtain satisfactory cooling of the axial bearing 15, i.e. the provision of a continuous circumferential fluid flow around the bearing shaft, is fulfilled regardless of where the passages 27,28 terminate in the circumferential path.

The outer portion of the bearing shaft 16 is cylindrical and provided with a plate 39 which forms a flange. The plate 39 is in slidable engagement with a thrust button which is mounted inside the roller cutter 17. For purposes of increasing its wear resistance a hard-facing material 40, such as Stellite, is applied by welding on the portion of the plate 39 which abuts the thrust button. Two diametrically opposed recesses 41,42 are formed in the plate 39. Cooling fluid is supplied to the bearing surfaces through passages 29,30 which terminate into the recesses 41,42.

During drilling cooling fluid flows through the passages 26,29,30 to the recesses 41,42, passes the roller bearing 13, the ball bearing 12 and the roller bearing 11 and then out throuh the annular gap between the roller cutter 17 and the leg 10.

Figure 5:
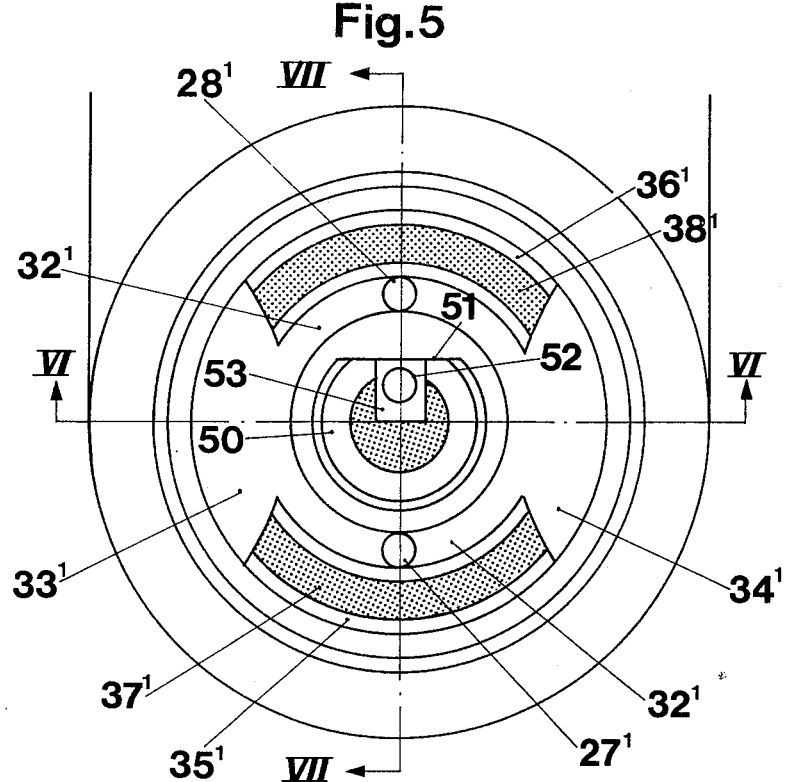
FIG. 5 shows a front view of the bearing shaft in a roller drill bit according to a second embodiment of the invention provided with a radial friction bearing at the outermost end of the bearing shaft.
Figure 6:
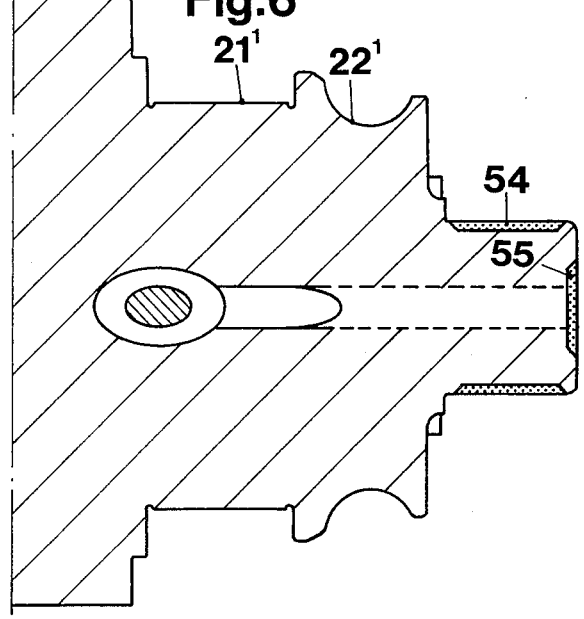
FIG. 6 is a section through the bearing shaft in FIG. 5 taken on the line VI—VI.
Figure 7:
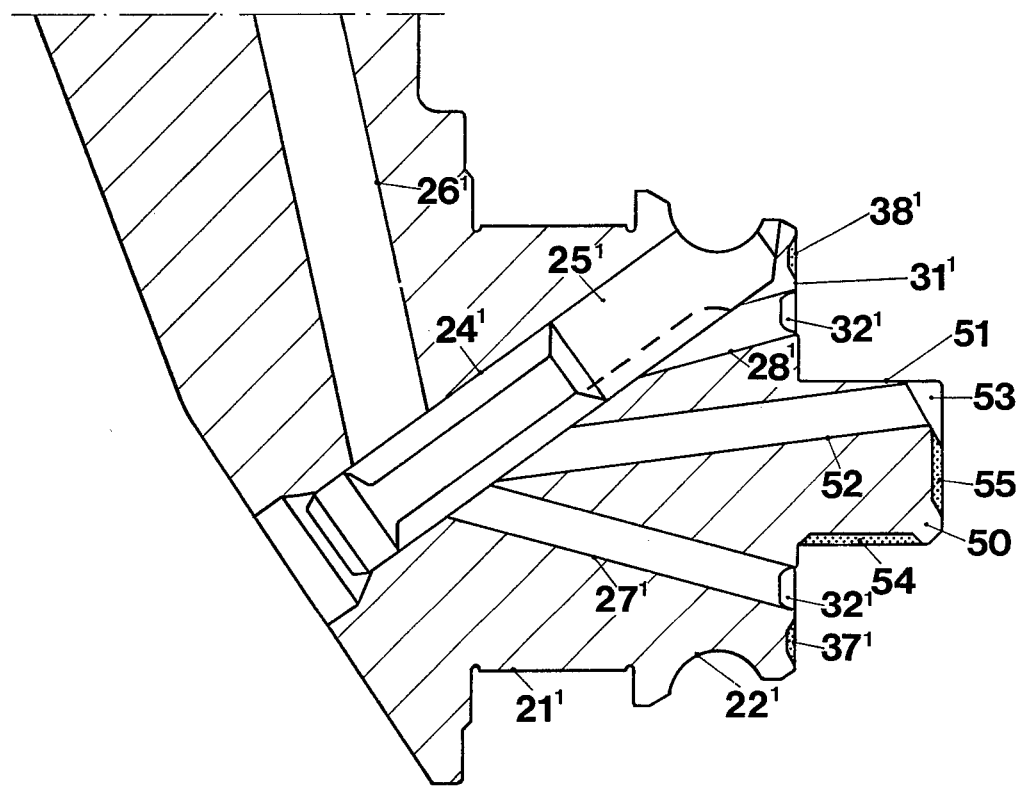
FIG. 7 is a section through the bearing shaft in FIG. 5 taken on the line VII—VII.

The embodiment according to FIGS. 5-7 differs from the embodiment according to FIGS. 2-4 merely in that the outer reduced diameter end portion of the bearing shaft 16 is journalled in a radial friction bearing instead of in a radial roller bearing.

Details in FIGS. 5-7 corresponding to similar details in FIGS. 2-4 have been given the same reference numeral with a prime sign. The outer portion 50 of the bearing shaft is cylindrical having its envelope surface bevelled at the upper unloaded side 51 for allowing through-flow of cooling fluid from the passages 26,52. In the vicinity of the mouth of the passage 52 the bearing shaft is cut off at 53 to ensure efficient cooling of the axial bearing 14. For purposes of increasing their wear resistance a hard-facing materal 54,55, such as Stellite, is applied by welding on the envelope surface and on the axial end surface of the outer portion 50 of the bearing shaft.

In the illustrated embodiment only one passage 52 extends to the outer portion 50 of the bearing shaft. When so desired, another passage may be provided in order to improve the cooling. Further, two passages 27',28' are provided for supplying cooling fluid to the large axial friction bearing with the abutments 35',36'. In certain cases, as mentioned in connection with FIGS. 2-4, only one passage is required.

I claim:

1. A rotary drill bit having improved cooling means for cooling the bearing surfaces therein and comprising a head, at least one bearing shaft projecting from said head, a roller cutter rotatably mounted on said bearing shaft, said roller cutter carrying cutting means, bearing means for rotatably supporting said roller cutter on said bearing shaft, said bearing means comprising cooperating annular surfaces on said roller cutter and bearing shaft for transmitting axial forces from said roller cutter to said bearing shaft, said annular surfaces being substantially normal to the axis of rotation of said roller cutter and positioned axially inwardly of the outer end of said bearing shaft, and passage means in said bearing shaft for supplying cooling fluid to said bearing means, the improvement wherein said passage means comprises:

a first recess portion in at least one of said annular surfaces, said first recess portion being endless and extending entirely around said bearing shaft within a plane disposed substantially normal to said axis of rotation and providing a continuous path for cooling fluid spaced radially inwardly from the peripheral edge of said one annular surface, at least a first passage extending through said bearing shaft and terminating within said first recess portions for conducting cooling fluid thereto, and at least one second recess portion extending radially outwardly from said first recess portion for conducting cooling fluid from said first recess portion.

2. A rotary drill bit according to claim 1, wherein the recess portions are provided in the annular surface of said bearing shaft.

3. A rotary drill bit according to claim 1, wherein the first recess portion comprises a circular groove.

4. A rotary drill bit according to claim 1, wherein there are two second recess portions, each being substantially segment-shaped, said segment-shaped second recess portions being positioned at diametrically opposed sides of the bearing shaft and extending radially from the continuous path to the periphery of the annular surfaces.

5. A rotary drill bit according to claim 4, wherein the portions of said annular surface on said bearing shaft to which axial forces are transmitted from the roller cutter comprise two substantially segment-shaped abutments positioned at diametrically opposed sides of the bearing shaft; the abutments are positioned between the segment-shaped recesses.

6. A rotary drill bit according to claim 1, wherein there are more than one second recess portion, the portions of said annular surface against which axial forces are transmitted from the roller cutter comprise two substantially segment-shaped abutments positioned at diametrically opposed sides of the bearing shaft radially outwardly of said first recess portion and circumferentially intermediate said second recesses.

7. A rotary drill bit according to claim 6, wherein a hard-facing material is applied on the abutments.

8. A rotary drill bit according to claim 1, wherein the outer portion of the bearing shaft is cylindrical and provided with a plate forming a flange.

9. A rotary drill bit according to claim 8, wherein two diametrically opposed third recess portions are formed in the plate, and wherein at least a second passage terminates into one of said opposed third recesses.

10. A rotary drill bit according to claim 8, wherein a portion of the plate abuts the roller cutter and is provided with a hard-facing material.

* * * * *